No. 627,578. Patented June 27, 1899.
J. R. FARRELL.
DETACHABLE BUTTON.
(Application filed June 3, 1898.)

(No Model.)

WITNESSES:
J. M. Dolan.
Leo. A. Walsh

INVENTOR:
John R. Farrell
by his atty
Clarke & Raymond

UNITED STATES PATENT OFFICE.

JOHN R. FARRELL, OF BOSTON, MASSACHUSETTS.

DETACHABLE BUTTON.

SPECIFICATION forming part of Letters Patent No. 627,578, dated June 27, 1899.

Application filed June 3, 1898. Serial No. 682,468. (No model.)

*To all whom it may concern:*

Be it known that I, JOHN R. FARRELL, a citizen of the United States, residing at Boston, in the county of Suffolk and State of Massachusetts, have invented a new and useful Improvement in Detachable Buttons, of which the following is a full, clear, and exact description, reference being had to the accompanying drawings, forming a part of this specification, in explaining its nature.

The invention relates to a detachable button having as an attaching device a metal hook, which is hinged at one end to one edge of the button-shank in a manner to permit its point or free end to be movable toward and from the corner of the other edge on an arc of a circle, and a locking bar or device which is pivoted to the shank of the button upon the edge opposite that to which the hook is pivoted, and which locking-bar has a lateral arm or extension, preferably curved, which is adapted to be moved back of and against the shank of the hook when in its closed position, and to lock the hook in its closed position, and to be held in said locking position by its own resiliency, the said locking bar or device being upon the outside of the button-shank and being situated where it may be readily operated either to lock the hook in its closed position or to permit of the opening of the same preparatory to disengaging the hook from the garment or material to which the button is being secured.

Figure 1:
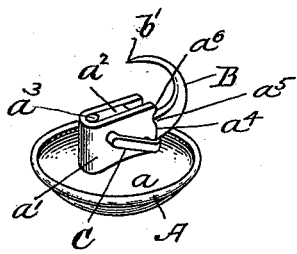
Figure 2:
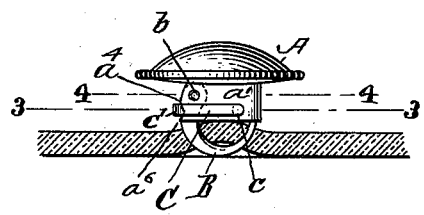
Figure 3:
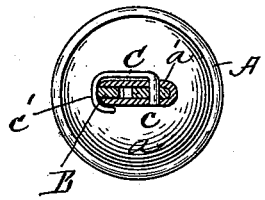
Figure 4:
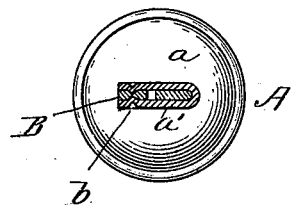

In the drawings, Figure 1 is a view in perspective of the detachable button inverted and with the hook in its open or engaging position. Fig. 2 is a view in elevation of a button, representing the hook as engaging the material of a garment and as fastened in engaging position. Fig. 3 is a cross-section upon the dotted line 3 3 of Fig. 2, and Fig. 4 is a cross-section upon the dotted line 4 4 of Fig. 2.

Referring to the drawings, A represents the button. From its back $a$ there extends a shank $a'$, which may be of any desired shape. The one represented is rectangular in cross-section and has the flat outer end $a^2$.

B is a curved fastening-hook. It is pivoted at $b$ in a recess in one edge of the shank and near its inner end, and it is shaped substantially as represented in Fig. 1, so that when fully opened its point $b'$ is in the engaging position therein shown, and when closed the hook assumes the position represented in Fig. 2—that is, it is in line with the shank, and the point $b'$ then closes into a small hole $a^3$ at its end. The shank may be made in any desired way, and the hook may be pivoted to it in any desired manner. I have represented as one way the prick-punching of the substance of the shank into an eye of the hook; but while this is a cheap and simple method of pivoting the hook to the shank of the button I do not limit myself to such manner of attachment.

C is the hook-lock. It is pivoted at $c$ to the edge of the shank opposite that to which the hook is pivoted, and it extends across the shank and has a curved outer end $c'$, which is adapted to be moved upon the outer side of the hook near its pivotal point when the hook is in its closed position. (See Figs. 2 and 3.) It then acts to lock the hook to the shank and prevent any movement thereof, so that the hook is converted into a stationary metal loop. The lock is held in closed or locked position by the slight projection $a^4$ on the edge of the shank, over which the part $c'$ of the lock is slightly strained to the receiving-notch $a^5$ beyond, and the projection $a^6$ upon the other side of the notch prevents the further movement of the hook-lock. This constitutes what may be termed a "hook-lock retainer." The resiliency of the section $c^7$ of the hook-lock holds it in the notch $a^5$ against accidental displacement. To release the hook, it is simply necessary to move backward the hook-lock to its original or innermost position. This hook-lock, it will be seen, is at all times readily accessible both for the purpose of closing or locking the hook and for the purpose of releasing it. In use the hook is moved to the position represented in Fig. 1, when its point may be easily passed through the material of the garment or thing to which it is to be attached, especially if the said material is folded to receive it. The movement of the hook-lock to locking position will then cause the hook to be turned to assume the form of a loop at the end of the shank, and the engagement of the lock with the notch serves to lock the hook as a stationary engaging and fastening loop. To remove the button, the hook-lock is moved backward to its original position, and the hook is then free to be withdrawn from the material.

It will be seen that the hook-lock when released occupies the position with respect to the button-hook shown in Fig. 1, when it is very nearly in line with the pivot of the button-hook, and that its locking position is shown in Fig. 2, which represents its long end as moved from said pivotal point to a locking position at one side of the pivotal point.

Having thus fully described my invention, I claim and desire to secure by Letters Patent of the United States—

1. A detachable button having a hook B pivoted at one end to the button, to be movable in respect to its back as shown and described, and a hook-lock pivoted to the back of the button at a point diametrically opposite that at which the hook is secured, and having at its free end a lateral extension which extends across the button and around the plane of the said hook, and is adapted to be swung against the rear of said hook and past its pivotal point, as set forth.

2. A button having a shank $a'$, a hook B pivoted to one edge of said shank and a locking-bar C pivoted near the opposite edge of said shank, and having a lateral locking extension $c'$ passing around the plane of said hook and adapted to be swung against its base, and a hook-lock retainer located to engage said hook-lock, when in its locking position, with relation to said hook, as set forth.

3. The detachable button having the shank $a'$, the hook B, a hook-lock C pivoted to the shank and adapted to engage the hook as specified, and a hook-lock retainer, comprising the notch $a^5$ in the edge of the shank, and the slight projections $a^4$, $a^6$ on each side of the notch.

JOHN R. FARRELL.

Witnesses:
F. F. RAYMOND, 2d,
J. M. DOLAN.